United States Patent
Jindal et al.

(10) Patent No.: US 9,731,674 B2
(45) Date of Patent: Aug. 15, 2017

(54) AIRBAG ASSEMBLY INCLUDING DEPRESSED REGION BELOW STEERING COLUMN

(71) Applicant: Ford Global Technologies, LLC, Dearborn, MI (US)

(72) Inventors: Pardeep Kumar Jindal, Canton, MI (US); Edward Joseph Abramoski, Canton, MI (US); Matthew B. Makowski, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 132 days.

(21) Appl. No.: 14/851,839

(22) Filed: Sep. 11, 2015

(65) Prior Publication Data
US 2017/0072890 A1 Mar. 16, 2017

(51) Int. Cl.
*B60R 21/16* (2006.01)
*B60R 21/203* (2006.01)
*B60R 21/231* (2011.01)

(52) U.S. Cl.
CPC .......... *B60R 21/203* (2013.01); *B60R 21/231* (2013.01); *B60R 2021/23169* (2013.01)

(58) Field of Classification Search
CPC ... B60R 21/045; B60R 21/205; B60R 21/206; B60R 21/216; B60R 21/235; B60R 21/2338; B60R 2021/23519; B60R 2021/21525; B60R 2021/23169; B60R 2021/23386
USPC ....................... 280/730.1, 731, 750, 751, 752
See application file for complete search history.

(56) References Cited

U.S. PATENT DOCUMENTS

| | | | |
|---|---|---|---|
| 4,721,329 A | 1/1988 | Brantman et al. | |
| 5,797,620 A * | 8/1998 | Eyrainer | B60R 21/206 280/730.1 |
| 6,032,978 A * | 3/2000 | Spencer | B60R 21/045 280/730.1 |
| 6,213,497 B1 * | 4/2001 | Spencer | B60R 21/045 280/730.1 |
| 6,435,554 B1 * | 8/2002 | Feldman | B60R 21/206 280/730.1 |
| 7,393,013 B2 * | 7/2008 | Best | B60R 21/045 280/750 |
| 7,396,040 B2 * | 7/2008 | Enders | B60R 21/231 280/730.1 |

(Continued)

FOREIGN PATENT DOCUMENTS

| | | |
|---|---|---|
| DE | 202013002020 U1 | 5/2013 |
| EP | 1826073 A1 | 8/2007 |
| JP | 08324368 | 12/1996 |

OTHER PUBLICATIONS

GB Search Report dated Jan. 27, 2017 (3 pages).

*Primary Examiner* — Toan To
(74) *Attorney, Agent, or Firm* — Frank A. MacKenzie; Bejin Bieneman PLC

(57) ABSTRACT

An airbag assembly includes an airbag and an inflator in communication with the airbag. The airbag includes a top side and includes a front side and a rear side each extending from the top side. The front side and the rear side define two extensions spaced from each other along the top side and a recess disposed between the extensions along the top side. The airbag includes a depressed region extending from the recess. The front side and the rear side are connected to each other along the depressed region.

20 Claims, 6 Drawing Sheets

(56) References Cited

U.S. PATENT DOCUMENTS

| | | | |
|---|---|---|---|
| 7,481,453 B2 | 1/2009 | Breed | |
| 7,604,252 B2 | 10/2009 | Heitplatz et al. | |
| 7,654,557 B2 * | 2/2010 | Enders | B60R 21/206 280/728.2 |
| 8,408,589 B2 | 4/2013 | Fukawatase et al. | |
| 8,448,980 B1 * | 5/2013 | Kalisz | B60R 21/237 280/730.1 |
| 8,720,941 B1 | 5/2014 | Svensson | |
| 2002/0125691 A1 * | 9/2002 | Conlee | B60R 21/045 280/730.1 |
| 2002/0149187 A1 * | 10/2002 | Holtz | B60R 21/206 280/749 |
| 2003/0107206 A1 * | 6/2003 | Takimoto | B60R 21/206 280/730.1 |
| 2011/0175334 A1 * | 7/2011 | Miller | B60R 21/206 280/730.2 |

* cited by examiner

AIRBAG ASSEMBLY INCLUDING DEPRESSED REGION BELOW STEERING COLUMN

BACKGROUND

Vehicles may include a variety of airbags deployable during vehicle impacts to absorb energy from occupants of the vehicles during the impact. The airbag defines an inflation chamber, and an inflator is in communication with the inflation chamber for inflating the airbag from an uninflated position to an inflated position. One type of airbag is a knee airbag that is deployable below a steering column of the vehicle to absorb impact from the knees of a driver during a vehicle impact. The knee airbag may be supported by the instrument panel, e.g., behind a knee bolster, or may be supported by the steering column.

Vehicles are subject to a variety of impact tests. These impact tests may include those standardized by the Insurance Institute for Highway Safety (IIHS) and the National Highway Traffic and Safety Agency (NHTSA). These impact tests may include tests that urge occupants of the vehicle to move forward and sideways, for example, offset frontal impacts and oblique impact tests. One such test is the small overlap rigid barrier (SORB) test, in which a front corner of the vehicle is impacted with a rigid barrier that is offset from the centerline of the vehicle. In this test, the test dummy in the driver seat is urged forwardly and toward the impacted corner of the vehicle. Another type of impact test is an Oblique Impact Test, in which the vehicle is impacted at an angle relative to the centerline of the vehicle and the test dummy in the driver seat is urged forward and in a cross-vehicle direction toward the driver side door of the vehicle or toward the passenger side door of the vehicle.

During an impact that urges the occupant forward and sideways, the knees of the occupant may be urged to slide across the knee airbag toward a front corner of the vehicle. This sliding movement reduces the absorption of the impact force, and the knees of the occupant may slide off of the airbag and impact other components of the vehicle interior. Inflation of the airbag to a relatively high inflation pressure may encourage the knees of the occupant to slide during these types of impact. In addition, depending on various factors, the knee airbag may billow around the steering column, which may encourage the knees of the occupant to slide during impacts that urge the occupant to move forward and sideways.

There remains an opportunity to design a knee airbag that reduces the likelihood of the knees of the occupant from sliding across the knee airbag during impacts that urge the occupant to move in a forward and sideways direction.

DETAILED DESCRIPTION

Figure 1:
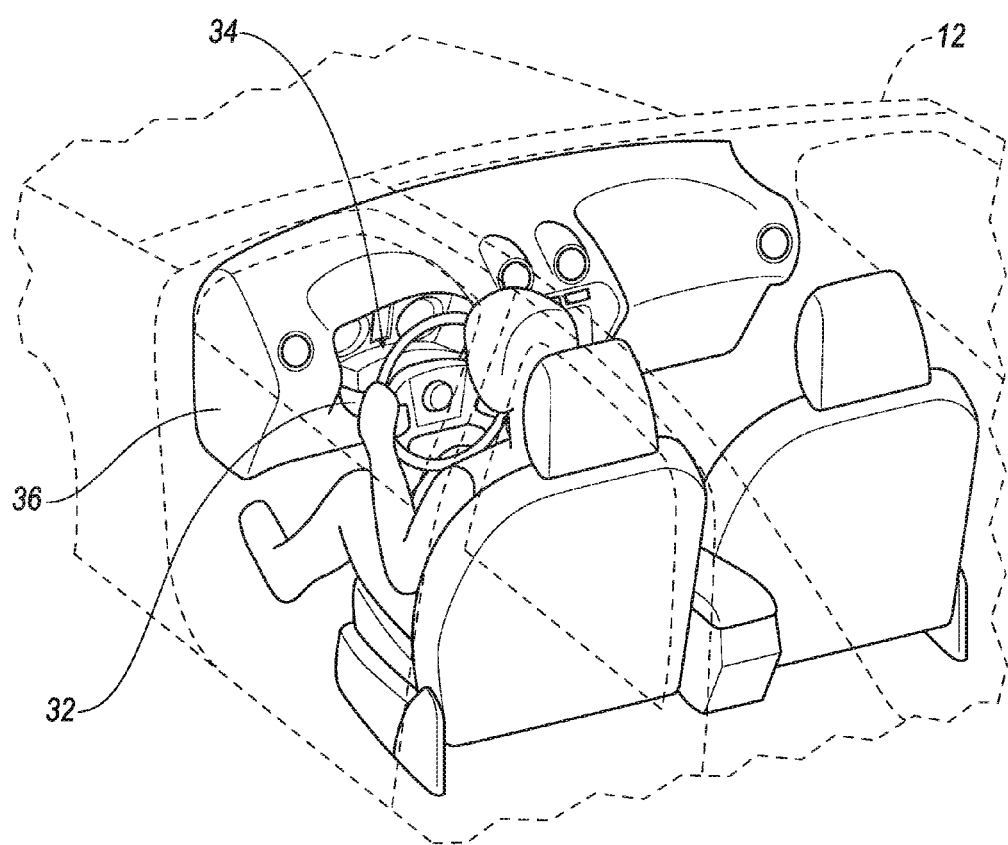
FIG. 1 is a perspective view of an instrument panel and steering column of a vehicle with an exterior of the vehicle shown in broken lines.

With reference to the Figures, wherein like numerals indicate like parts throughout the several views, an airbag assembly 10 for a vehicle 12 includes an airbag 14 and an inflator 16. The airbag 14 defines an inflation chamber 18 and the inflator 16 is in communication with the inflation chamber 18. The airbag 14 includes a top side 20 and includes a front side 22 and a rear side 24 each extending from the top side 20. The inflation chamber 18 is defined between the front side 22 and the rear side 24. The front side 22 and the rear side 24 define two extensions 26 spaced from each other along the top side 20 and a recess 28 disposed between the extensions 26 along the top side 20. The airbag 14 includes a depressed region 30 extending from the recess 28. The front side 22 and the rear side 24 are connected to each other along the depressed region 30.

Since the recess 28 is disposed between the extensions 26 along the top side 20, the extensions 26 and the recess 28 may wrap around a steering column 32 of the vehicle 12, as set forth further below. This configuration reduces the likelihood of the airbag 14 billowing around the steering column 32. In addition, since the front side 22 and the rear side 24 are connected to each other along the depressed region 30, the depressed region 30 also reduces the likelihood of the airbag 14 billowing around the steering column 32.

During the design of the airbag assembly 10, the size of the depressed region 30 may be adjusted to adjust inflation pressure in the inflation chamber 18 without adjusting the size of the inflator 16 and/or without adding and/or modifying vents in the airbag 14. Adjusting the size of the depressed region 30 to adjust the inflation pressure may be simpler and more cost effective than adjusting the size of the inflator 16. For example, inflation pressure may be adjusted by adjusting the size of the depressed region 30 when redesigning an airbag assembly 10 from one model year to the next, when redesigning the airbag assembly 10 from one vehicle model to another vehicle model, etc.

Figure 2:
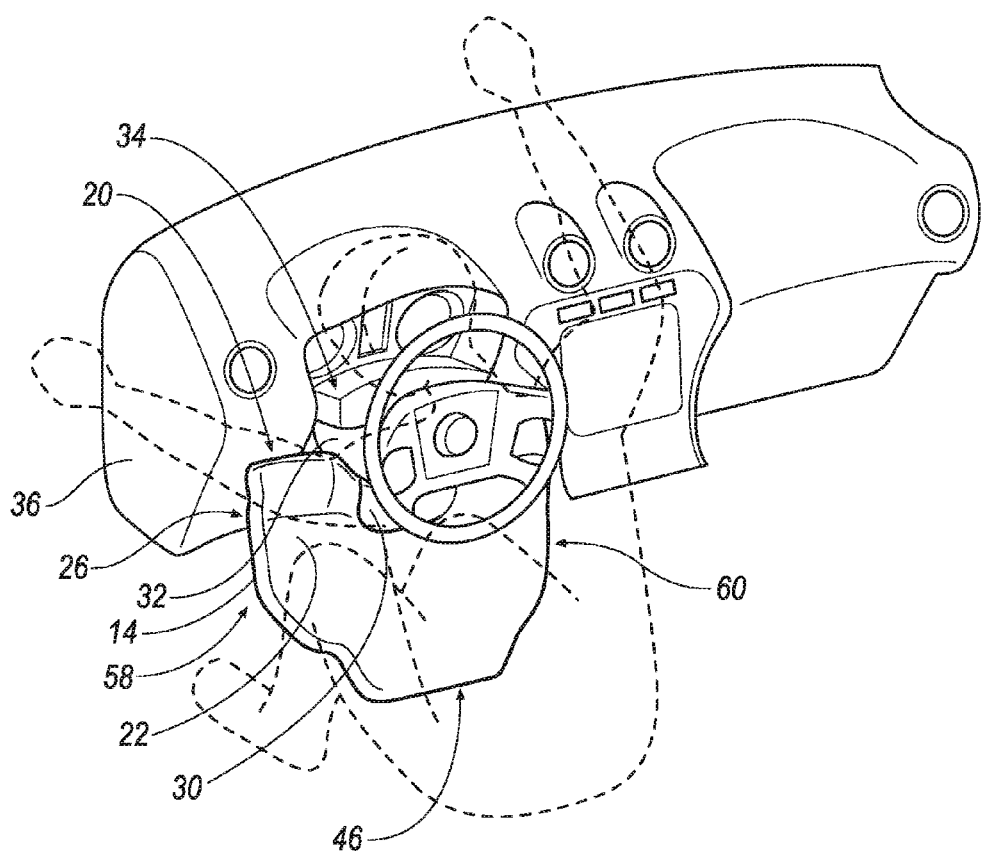
FIG. 2 is a perspective view of the instrument panel with an airbag in an inflated position and an occupant being urged toward the front left side of the vehicle in response to a vehicle impact.
Figure 3:
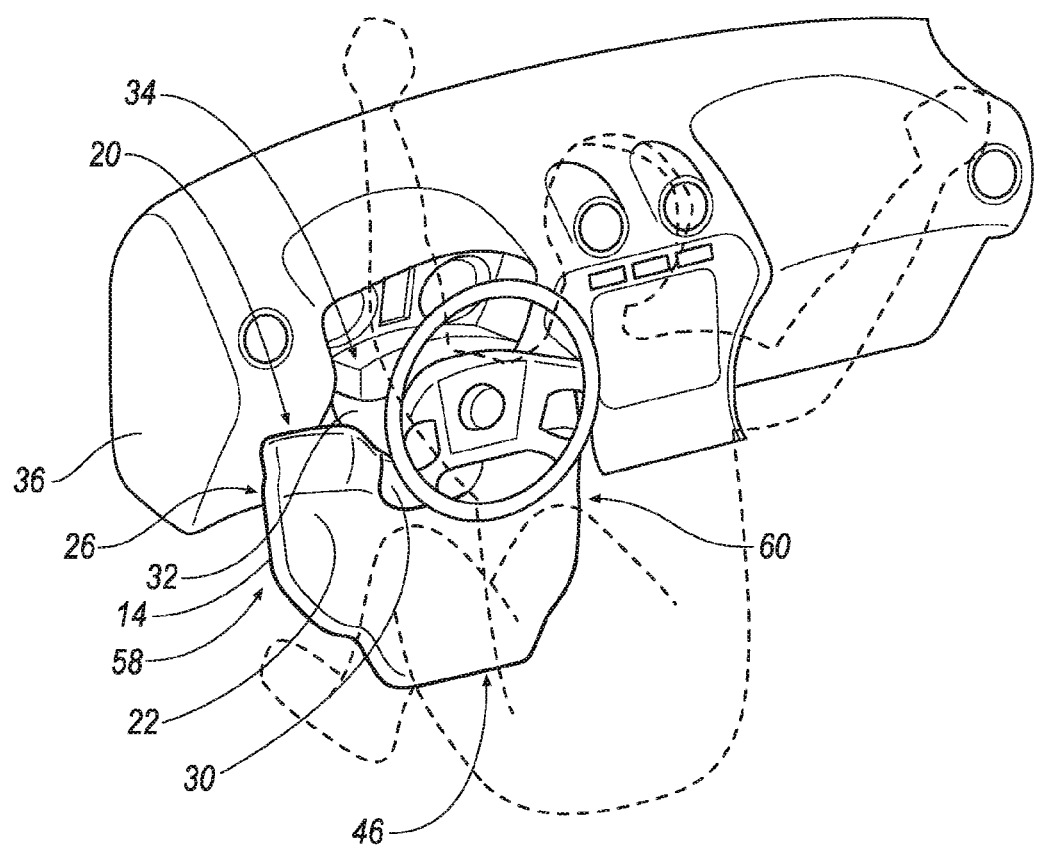
FIG. 3 is a perspective view of the instrument panel with the airbag in the inflated position and the occupant being urged toward the front right side of the vehicle in response to a vehicle impact.

With reference to FIGS. 1-3, the airbag 14 may be a knee airbag. Specifically, a steering column assembly 34 may include the steering column 32 and the airbag 14, and the airbag 14 may be deployable below the steering column 32 to absorb impact from knees of a driver during a vehicle 12 impact. In this configuration, the airbag 14 may be supported by an instrument panel 36, e.g., behind a knee bolster 44, and/or may be supported by the steering column 32.

The airbag 14 may be inflatable from an uninflated position, as shown in FIG. 1, to an inflated position, shown in FIGS. 2 and 3. In the uninflated position, the airbag 14 may be stowed behind trim, e.g., the knee bolster 44 and/or a shroud on the steering column 32. The inflator 16 may inflate the inflation chamber 18 to inflate the airbag 14 to the inflated position, in which the airbag 14 extends through the trim to absorb energy impact from knees of the driver during a vehicle 12 impact.

With reference to FIGS. 2 and 3, the extensions 26 and the recess 28 are configured to extend partially around the steering column 32 when the airbag 14 is in an inflated position. For example, the extensions 26 and recess 28 are U-shaped. The recess 28 and the extensions 26 may each be configured to extend along the steering column 32 of a vehicle 12. The depressed region 30 is configured to be below the steering column 32 in the inflated position, and the extensions 26 are configured to extend upwardly along sides of the steering column 32 in the inflated position. The extensions 26 and the recess 28 may, for example, be configured to abut the steering column 32 in the inflated position.

Figure 4:
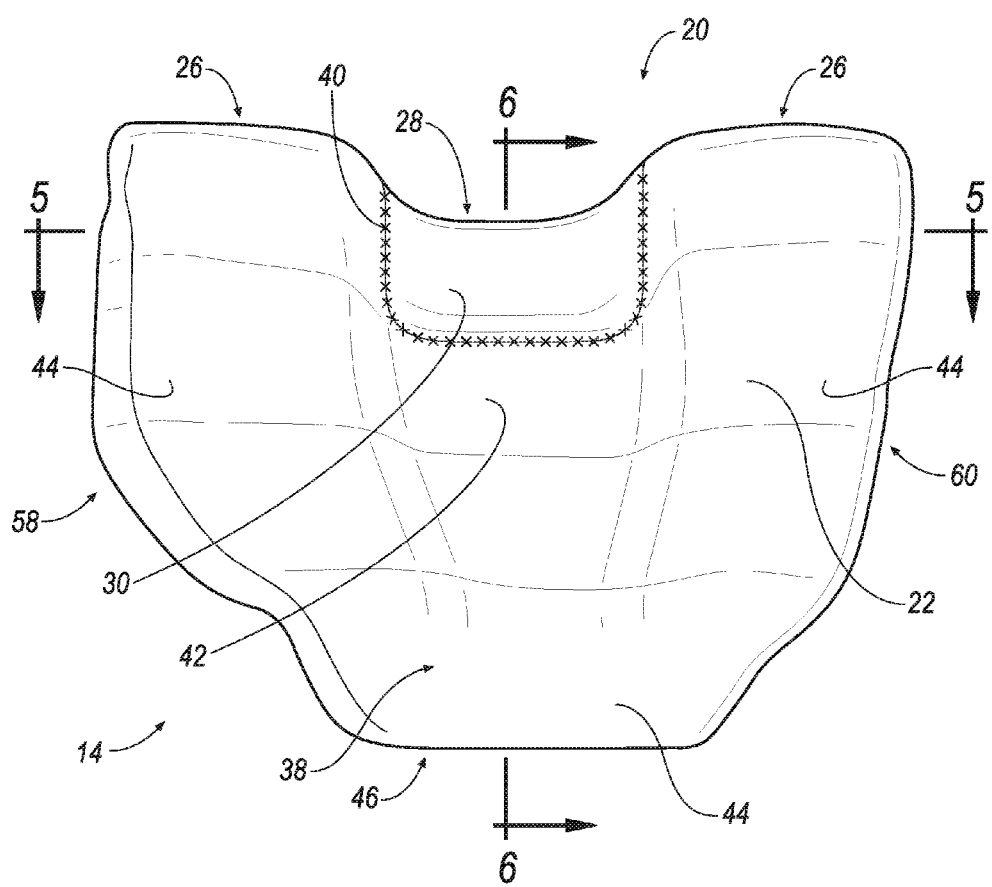
FIG. 4 is a perspective view of the airbag.
Figure 5:
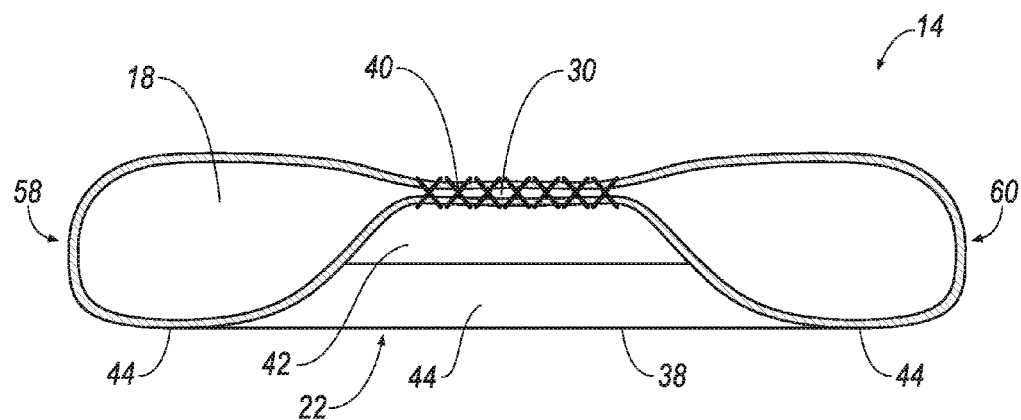
FIG. 5 is a cross-sectional view of the airbag along line 5 of FIG. 4.
Figure 6:
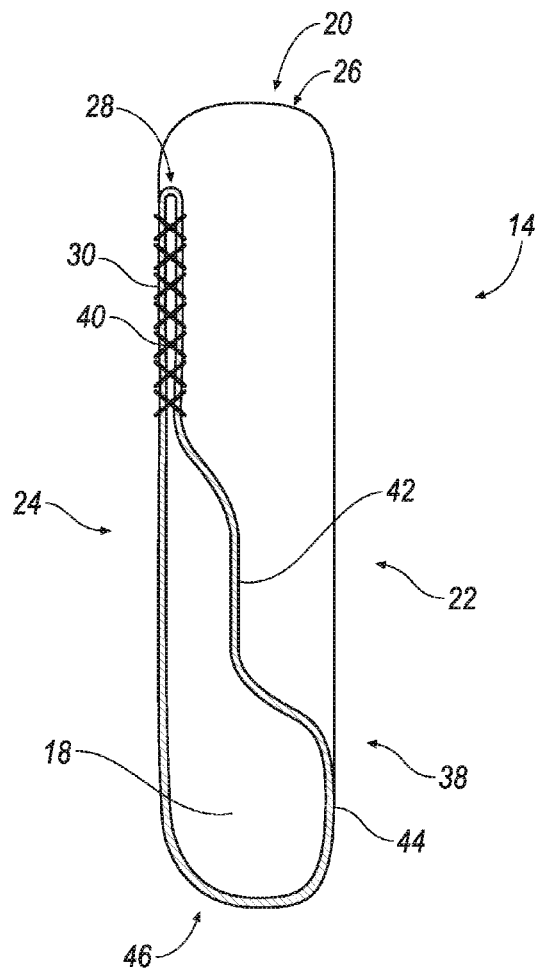
FIG. 6 is a cross-sectional view of the airbag along line 6 of line 4.

With reference to FIGS. 4-6, as set forth above, the recess 28 and the extensions 26 extend along the top side 20 of the airbag 14. The airbag 14 includes a bottom side 46 spaced from the top side 20. In the inflated position, the top side 20 is disposed at a top of the airbag 14 and the bottom side 46 is disposed at a bottom of the airbag 14. The front side 22 and the rear side 24 may each extend from the top side 20 to the bottom side 46.

With continued reference to FIGS. 4-6, the front side 22 and the rear side 24 each extend from the top side 20 to the bottom side 46 along a left side 58 and a right side 60. The extensions 26 may be defined at the left side 58 and the right side 60. The top side 20, the bottom side 46, the left side 58, and the right side 60 may be integrally formed with each other, i.e., formed simultaneously as a single unit, or may be stitched panels.

When the airbag 14 is in the inflated position, the distance from the front side 22 to the rear side 24 at the extensions 26 is greater than the distance from the front side 22 to the rear side 24 at the depressed region 30. In other words, the airbag 14 is thicker at the extensions 26 than at the depressed region 30. The depressed region 30 may be uninflated when the airbag 14 is in the inflated position, or alternatively, inflation may be restrained such that the depressed region 30 is depressed relative to the extensions 26.

The airbag 14 may include a main portion 38 formed by the front side 22 and the rear side 24 below the extensions 26 and the depressed region 30. The distance from the front side 22 to the rear side 24 at the main portion 38 is greater than the distance from the front side 22 to the rear side 24 at the depressed region 30. In other words, the airbag 14 is thicker at the main portion 38 than at the depressed region 30.

The front side 22 and the rear side 24 are stitched to each other along the depressed region 30. Specifically, stitching 40 may engage both the front side 22 and the rear side 24. The stitching 40 may be configured, e.g., sized and shaped, to maintain depressed region 30 uninflated when the airbag 14 is in the inflated position, or, alternatively, the stitching 40 may be configured to restrain inflation of the depressed region 30 to maintain the depressed region 30 depressed relative to the extensions 26 when the airbag 14 is in the inflated position.

The stitching 40 may extend around the perimeter of the depressed region 30 to define the boundary of the depressed region 30. The stitching 40 may extend across the depressed region 30 to, at least in part, reinforce the depressed region 30 to maintain the depressed region 30 depressed relative to the extensions 26 and the main portion 38 when the airbag 14 is in the inflated position.

In the alternative to, or in addition to the stitching 40, relative movement of the front side 22 and the rear side 24 may be restrained in the depressed region 30 in any suitable way. As one example, the front side 22 and the rear side 24 may be welded, fused, adhered, etc., to each other at the depressed region 30.

The depressed region 30 extends from the top side 20 toward the bottom side 46. In other words, the depressed region 30 initiates at the top side 20, extends toward the bottom side 46, and may terminate before the bottom side 46, i.e., may be spaced from the bottom side 46. The depressed region 30 may extend 10-70 mm from the top side 20 toward the bottom side 46.

The depressed region 30 may be disposed between the extensions 26. Specifically, the depressed region 30 may extend from one extension 26 to the other extension 26, i.e., may terminate at the extensions 26. The depressed region 30 may be generally rectangular from the top side 20 toward the bottom side 46 and between the extensions 26.

The main portion 38 of the airbag 14 may include areas of varying thickness, i.e., distance between the front side 22 and the rear side 24, when the airbag 14 is in the inflated position. For example, as shown in FIGS. 4-6, the main portion 38 may define a pocket 42 disposed below the depressed region 30 and a bolster 44 extending around the pocket 42 when the airbag 14 is in the inflated position, i.e., between the pocket 42 and the bottom side 46. The pocket 42 and the bolster 44 may be formed in any suitable fashion when the airbag 14 is in the inflated position. For example, tethers and/or internal vents may define the pocket 42 and the bolster 44.

The pocket 42 and bolster 44 may, for example, receive the knees of the occupant when the airbag 14 is in the inflated position during a vehicle 12 impact. In this position, the pocket 42 and the bolster 44 may restrain or prevent movement of the knees of the occupant in a cross-vehicle 12 direction toward a driver door or a passenger door of the vehicle 12. Specifically, the pocket 42 and the bolster 44 may restrain or prevent sliding of the knees of the occupant across the airbag 14.

The airbag 14 may be formed of any suitable type of material, e.g., from a woven polymer. For example, the airbag 14 may be formed of woven nylon yarn, e.g., nylon 6, 6. Other suitable examples include polyether ether ketone (PEEK), polyetherketoneketone (PEKK), polyester, or any other suitable polymer. The woven polymer may include a coating, such as, for example, silicone, neoprene, urethane, etc. For example, the coating may be polyorgano siloxane.

Figure 7:
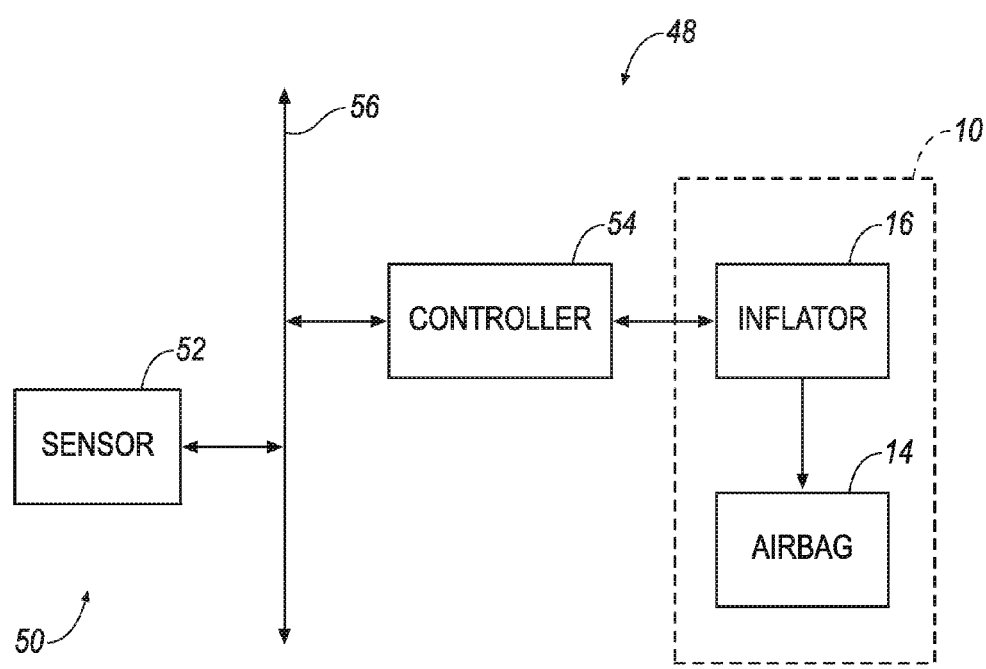
FIG. 7 is a schematic of an airbag system.

As set forth above, the airbag assembly 10 includes the inflator 16, shown schematically in FIG. 7. The inflator 16 is in communication with the inflation chamber 18 to expand the inflation chamber 18 with an inflation medium, such as a gas. The inflator 16 may be, for example, a pyrotechnic inflator 16 that uses a chemical reaction to drive inflation medium to the inflation chamber 18. The inflator 16 may be of any suitable type, for example, a cold-gas inflator 16.

The airbag assembly 10 may be mounted to the vehicle 12 in any suitable fashion. For example, the airbag assembly 10 may be mounted to the instrument panel 36 and/or the steering column 32.

The airbag assembly 10 may be a component of an airbag system 48, which is shown schematically in FIG. 7. The airbag system 48 includes an impact sensing system 50, which may include at least one impact sensor 52 for sensing impact of the vehicle 12. The impact sensor 52 is the only component of the impact sensing system 50 shown in FIG. 7, however, it should be appreciated that the impact sensing system 50 may include additional components not shown in FIG. 7.

The airbag assembly 10 may include a controller 54. The controller 54 and the sensor 52 may be connected to a communication bus 56, such as a controller area network (CAN) bus, of the vehicle 12. The controller may use information from the communication bus 56 to control the activation of the inflator 16. The inflator 16 may be connected to the controller 54, as shown in FIG. 7, or may be connected directly to the communication bus 56.

The controller 54 may be in communication with the sensor 52 and the inflator 16, directly or through the communication bus 56, for activating the inflator 16, e.g., for providing an impulse to a pyrotechnic charge of the inflator 16, when the sensor 52 senses an impact of the vehicle 12. Alternatively or additionally to sensing impact, the impact sensing system 50 may be configured to sense impact prior to impact, i.e., pre-impact sensing. The sensor 52 may be of any suitable type, e.g., using radar, lidar, and/or a vision system. The vision system may include one or more cameras, CCD image sensors, and/or CMOS image sensor 52, etc.

The controller 54 may be a microprocessor-based controller. The sensor 52 is in communication with the controller 54 to communicate data to the controller. Based on the data communicated by the sensor 52, the controller instructs the inflator 16 to activate.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag assembly comprising:
an airbag defining an inflation chamber; and
an inflator in communication with the inflation chamber;
the airbag including a top side and including a front side and a rear side each extending from the top side with the inflation chamber defined between the front side and the rear side;
the front side and the rear side defining two extensions spaced from each other along the top side and a recess disposed between the extensions along the top side;
the airbag including a depressed region extending from the recess, wherein the front side and the rear side are connected to each other along the depressed region.

2. The airbag assembly as set forth in claim 1 wherein the front side and the rear side are stitched to each other along the depressed region.

3. The airbag assembly as set forth in claim 1 wherein extensions and recess are U-shaped and wherein the depressed region is generally rectangular.

4. The airbag assembly as set forth in in claim 3 wherein the depressed region extends from one extension to the other extension.

5. The airbag assembly as set forth in claim 1 wherein the airbag includes a bottom side spaced from the top side with front side and the rear side each extending from the bottom side, wherein the depressed region extends from the top side toward the bottom side.

6. The airbag assembly as set forth in in claim 5 wherein the depressed region extends from one extension to the other extension.

7. The airbag assembly as set forth in claim 6 wherein extensions and recess are U-shaped and wherein the depressed region is generally rectangular.

8. The airbag assembly as set forth in claim 5 wherein the depressed region extends 10-70 mm from the top side toward the bottom side.

9. The airbag assembly as set forth in claim 1 wherein the airbag is inflatable from an uninflated position to an inflated position, wherein the distance from the front side to the rear side at the extensions is greater than the distance from the front side to the rear side at the depressed region.

10. The airbag as set forth in claim 1 wherein the recess is configured to extend along a steering column of a vehicle.

11. A steering column assembly comprising:
a steering column; and
an airbag including two extensions and a recess disposed between the extensions, the extensions and the recess being configured to extend partially around the steering column when the airbag is in an inflated position;
wherein a front side and a rear side of the airbag are connected to each other along a depressed region configured to be below the steering column in the inflated position; and
wherein the distance from the front side to the rear side at the extensions is greater than the distance from the front side to the rear side at the depressed region.

12. The steering column assembly as set forth in claim 11 wherein the front side and the rear side are stitched to each other along the depressed region.

13. The steering column assembly as set forth in claim 11 wherein extensions and recess are U-shaped and wherein the depressed region is generally rectangular.

14. The steering column assembly as set forth in in claim 13 wherein the depressed region extends from one extension to the other extension.

15. The steering column assembly as set forth in claim 11 wherein the airbag includes a top side and a bottom side with the front side and the rear side each extending from the top side to the bottom side, wherein the depressed region extends from the top side toward the bottom side.

16. The steering column assembly as set forth in in claim 15 wherein the depressed region extends from one extension to the other extension.

17. The steering column assembly as set forth in claim 16 wherein extensions and recess are U-shaped and wherein the depressed region is generally rectangular.

18. The steering column assembly as set forth in claim 15 wherein the depressed region extends 10-70 mm from the top side toward the bottom side.

19. The steering column assembly as set forth in claim 11 wherein the extensions and the recess are configured to abut the steering column in the inflated position.

20. A steering column assembly comprising:
a steering column; and
an airbag including two extensions and a recess disposed between the extensions, the extensions and the recess being configured to extend partially around the steering column when the airbag is in an inflated position;
wherein a front side and a rear side of the airbag are connected to each other along a depressed region configured to be below the steering column in the inflated position; and
wherein the airbag includes a top side and a bottom side with the front side and the rear side each extending from the top side to the bottom side, wherein the depressed region extends from the top side toward the bottom side.

* * * * *